United States Patent
Tanikawa et al.

(10) Patent No.: US 7,278,441 B2
(45) Date of Patent: Oct. 9, 2007

(54) FLUID CONTROLLER

(75) Inventors: Tsuyoshi Tanikawa, Osaka (JP);
Tadayuki Yakushijin, Osaka (JP)

(73) Assignee: Fujikin Incorporated, Osaka-shi (JP)

( * ) Notice: Subject to any disclaimer, the term of this patent is extended or adjusted under 35 U.S.C. 154(b) by 0 days.

(21) Appl. No.: 10/526,156

(22) PCT Filed: Aug. 22, 2003

(86) PCT No.: PCT/JP03/10604

§ 371 (c)(1),
(2), (4) Date: Mar. 1, 2005

(87) PCT Pub. No.: WO2004/023011

PCT Pub. Date: Mar. 18, 2004

(65) Prior Publication Data

US 2006/0060806 A1    Mar. 23, 2006

(30) Foreign Application Priority Data

Sep. 2, 2002  (JP) .............................. 2002-256617

(51) Int. Cl.
*F16K 31/00* (2006.01)
(52) U.S. Cl. ..................... 137/270; 251/63.5
(58) Field of Classification Search .............. 251/63.6, 251/63.5, 62; 137/270
See application file for complete search history.

(56) References Cited

U.S. PATENT DOCUMENTS

| | | | | |
|---|---|---|---|---|
| 3,122,065 A | * | 2/1964 | Laun | .............................. 92/59 |
| 3,958,592 A | * | 5/1976 | Wells et al. | .............. 137/315.3 |
| 4,828,219 A | * | 5/1989 | Ohmi et al. | ................. 251/118 |
| 2001/0019116 A1 | * | 9/2001 | Fukano et al. | .............. 251/63.6 |

FOREIGN PATENT DOCUMENTS

| | | |
|---|---|---|
| JP | 63-289388 | 11/1988 |
| JP | 2-47326 | 12/1990 |
| JP | 3-42292 | 9/1991 |
| JP | 6-94142 | 4/1994 |
| JP | 7-139649 | 5/1995 |
| JP | 8-75017 | 3/1996 |
| JP | 08075017 A | * 3/1996 |

OTHER PUBLICATIONS

International Search Report of Nov. 18, 2003.

* cited by examiner

*Primary Examiner*—Eric Keasel
*Assistant Examiner*—Andrew J. Rost
(74) *Attorney, Agent, or Firm*—Kratz, Quintos & Hanson, LLP

(57) ABSTRACT

A fluid control device 1 has an upper space S1 formed between and defined by the upper surface of a piston 10 and the lower surface of top wall 8*a* of an upper casing 8, and a lower space S2 formed between and defined by the lower surface of the piston 10 and the upper surface of bottom wall 7*a* of a lower casing 7. A compression coil spring 11 for biasing the piston 10 is disposed in one of the upper space S1 and the lower space S2, and a compressed air admitting passage 15 communicates with the other space.

6 Claims, 2 Drawing Sheets

FLUID CONTROLLER

TECHNICAL FIELD

The present invention relates to fluid control devices, and more particularly to a fluid control device which is of the normally open type or normally closed type as determined in accordance with the direction of the biasing force of a spring incorporated therein and wherein a fluid channel is opened or closed by the supply or discharge of compressed air.

BACKGROUND ART

Normally closed fluid control devices are already known which comprise a valve case having a fluid channel, a valve element holder upwardly or downwardly movable for holding a valve element for opening or closing the fluid channel, a lower casing attached to a bonnet provided on an upper portion of the valve case, an upper casing joined to the lower casing, a valve stem disposed in a space defined by the upper and lower casings and having a lower end in bearing contact with the valve element holder, a piston secured to the valve stem by a retaining ring, and a compression coil spring bearing on and retained by the top wall of the bonnet and a flange provided on the valve stem so as to be positioned below the bonnet top wall. The fluid channel is opened by admitting compressed air into a lower space formed between and defined by the lower surface of the piston and the upper surface of bottom wall of the lower casing (see, for example, the publication of JP-A No. 11-256578, pars. 0002 to 0003 and FIG. 3).

The normally closed fluid control device may be modified into a normally open fluid control device by providing a compression coil spring as held between a lower portion of a bonnet and a flange provided on the valve stem so as to be positioned above the bonnet lower portion and introducing compressed air into an upper space formed between and defined by the upper surface of the piston and the lower surface of top wall of the upper casing.

With the conventional fluid control devices described above, the normally closed type and the normally open type are handled as different individual devices, such that when designing one of these two types, no consideration is given to the interior construction of the other type. Accordingly, the control device of the normally open type and that of the normally closed type as used on the same piping system are very great in the combined number of components.

An object of the present invention is to provide a fluid control device which is useful for providing fluid control devices of the normally closed type and the normally open type which are reduced in the combined number of components.

DISCLOSURE OF THE INVENTION

The present invention provides a fluid control device comprising a valve case having a fluid channel, a valve element holder upwardly or downwardly movable for holding a valve element for opening or closing the fluid channel, a lower casing provided on an upper portion of the valve case, an upper casing joined to the lower casing, a valve stem disposed in a space defined by the upper and lower casings and having a lower end in bearing contact with the valve element holder and a piston secured to the valve stem, an upper space being formed between and defined by an upper surface of the piston and a lower surface of a top wall of the upper casing, a lower space being formed between and defined by a lower surface of the piston and an upper surface of a bottom wall of the lower casing, the fluid control device being characterized in that a compression coil spring is provided in one of the upper space and the lower space for biasing the piston, a compressed air admitting passageway being in communication with the other of the upper and lower spaces.

When the compression coil spring for biasing the piston is provided in the upper space with the compressed air admitting passageway in communication with the lower space, the fluid control device of the invention serves as a fluid control device of the normally closed type wherein the piston is biased downward axially of the device. When the compression coil spring for biasing the piston is provided in the lower space with the compressed air admitting passageway in communication with the upper space, the fluid control device of the invention serves as a fluid control device of the normally open type wherein the piston is biased upward axially of the device. Accordingly, the normally closed fluid control device and the normally open fluid control device can be obtained by using the valve case, valve element, valve element holder, lower casing, upper casing, valve stem and piston as common components. This reduces the combined number of components of the fluid control devices of the two types.

The valve stem and the piston may be made separate members and then connected together, but it is desirable to provide the valve stem and the piston in the form of an integral member. This eliminates the need to secure the piston to the valve stem with a retaining ring, decreasing the number of components and resulting in improved pressure resistance.

Further it is desirable to provide a spring bearing annular recessed portion in each of the top wall lower surface of the upper casing and the bottom wall upper surface of the lower casing. In the fluid control device of the normally closed type, the compression coil spring is then retained by the annular recessed portion of the top wall of the upper casing, while in the fluid control device of the normally open type, the compression coil spring is retained by the annular recessed portion of the bottom wall of the lower casing. The coiled spring required for the control device can therefore be retained in place regardless of whether it is of the normally closed type or normally open type.

Preferably, the top wall of the upper casing is provided with an internally threaded portion having an upward opening for connecting a compressed air admitting pipe and a compressed air admitting downward passage opened to the upper space and extending from a lower end of the internally threaded portion. The compressed air admitting portion can then be used in common for the normally closed type and the normally open type. For introducing compressed air into the lower space in the normally closed type, a compressed air passageway is formed in the piston for causing the downward passage to communicate with the lower space.

As a preferred embodiment of fluid control device, the fluid control device is of the normally open type, wherein the compression coil spring is retained by the lower surface of the piston and the annular recessed portion in the lower casing upper surface. Alternatively the fluid control device is of the normally closed type, wherein a spring bearing annular recessed portion is formed in the upper surface of the piston, and the compression coil spring is retained by the annular recessed portion of the piston and the annular recessed portion in the upper casing lower surface, the piston having an upper small-diameter portion fitted in the downward passage of the upper casing, the piston being provided with a compressed air passageway communicating at an upper end thereof with the downward passage in the top wall of the upper casing and at a lower end thereof with the lower space.

BEST MODE OF CARRYING OUT THE INVENTION

Embodiments of the invention will be described below with reference to the drawings. In the following description, the terms "left" and "right" refer respectively to the left- and right-hand sides of the drawings.

Figure 1:
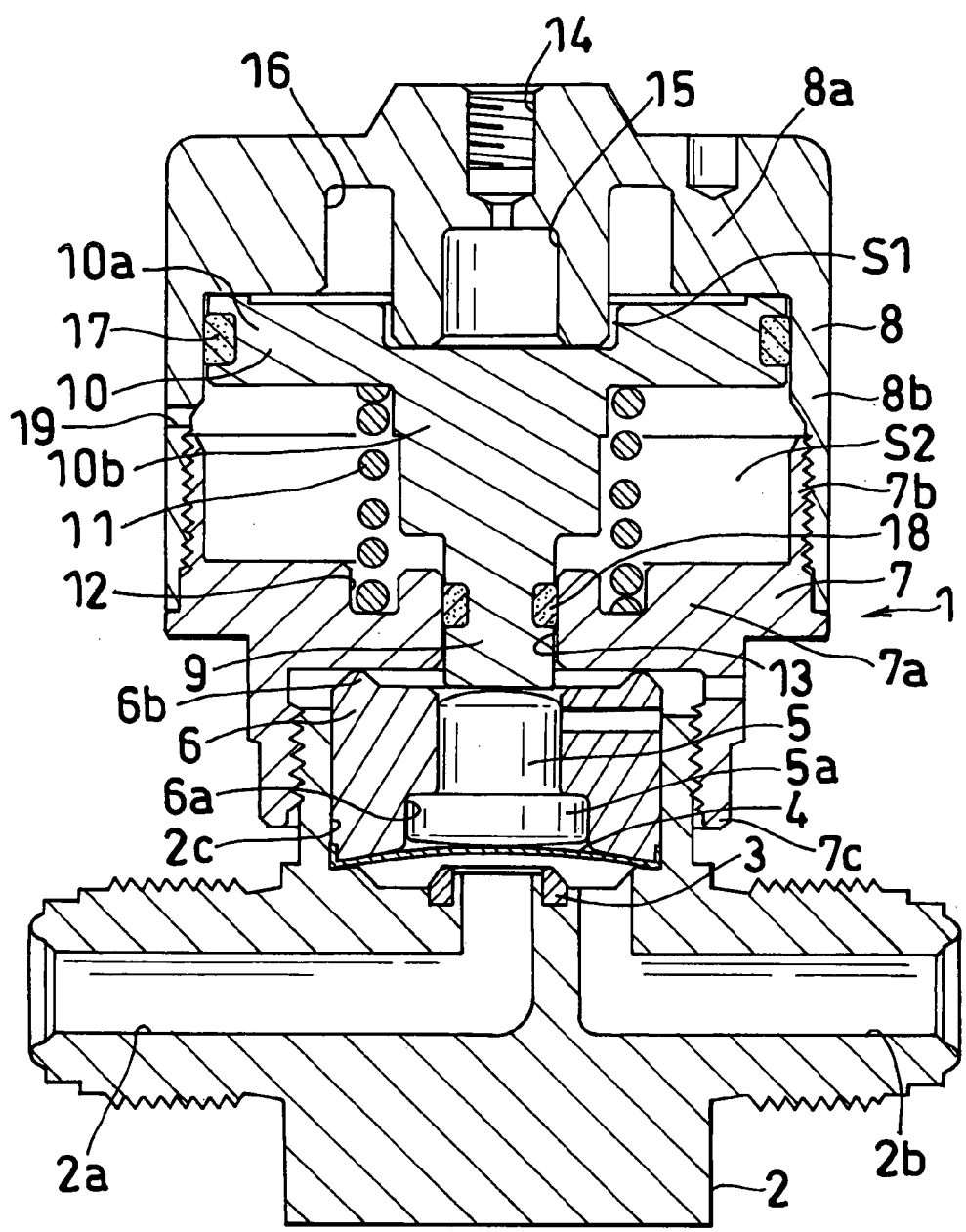
FIG. 1 is a sectional view showing a first embodiment of fluid control device (of the normally open type) according to the invention.

FIG. 1 shows a first embodiment of fluid control device of the present invention.

The fluid control device 1 of this embodiment is of the normally open type and comprises a valve case 2 provided with a fluid inlet channel 2a and a fluid outlet channel 2b, an annular valve seat 3 formed around a peripheral edge defining an opening of the inlet channel 2a, a diaphragm (valve element) 4 movable into or out of pressing contact with the valve seat 3 for closing or opening the fluid channel 2a, a disk (valve element holder) 5 movable upward or downward for holding the diaphragm 4, a bonnet 6 fitted around the disk 5, a lower casing 7 disposed on an upper portion of the valve case 2, an upper casing 8 joined to the lower casing 7, a valve stem 9 disposed within a space defined by the lower and upper casings 7, 8 and having a lower end in bearing contact with the valve element holder 5, a piston 10 secured to the valve stem 9, and a compression coil spring 11 for biasing the piston 10 upward.

The valve case 2 has a cavity 2c which is open upward. The inlet channel 2a has one end which is open leftward and the other end which is open at the center of bottom wall of the cavity 2c. The outlet channel 2b has one end which is open rightward and the other end which is open at a right portion of the bottom wall of the cavity 2c.

The disk 5 is in the form of a solid cylinder and has a flange 5a at its lower end. The bonnet 6 is in the form of a hollow cylinder and has a lower-end inner periphery defining a large-diameter portion 6a having an inside diameter slightly larger than the outside diameter of the flange 5a of the disk 5. The bonnet 6 is tightly fitted in the cavity 2c of the valve case 2 and secures the outer peripheral portion of the diaphragm 4 to the valve case 2. The disk 5 is loosely fitted into the bonnet 6 from below. Although immovable upward in the illustrated state (channel opening state), the disk 5 is movable downward (channel closing direction).

The lower casing 7 comprises a bottom wall 7a, a hollow cylindrical peripheral wall 7b upstanding from the bottom wall 7a and having an externally threaded portion on its outer periphery, and a hollow cylindrical downward projection 7c of small diameter extending downward from the bottom side of the bottom wall 7a and having an internally threaded portion on its inner periphery. The internally threaded portion of the downward projection 7c is in screw-thread engagement with an externally threaded portion of a peripheral wall of the valve case 2 which wall defines the cavity 2c, whereby the lower casing 7 is secured to the valve case 2. The bonnet 6 is provided on its top with an annular ridge 6b serving as a stopper when the lower casing 7 is tightened up.

An annular recessed portion 12 for retaining the compression coil spring 11 is formed in the upper surface of the bottom wall 7a of the lower casing 7. A through bore 13 is formed in the bottom wall 7a of the lower casing 7 centrally thereof for guiding the valve stem 9 upwardly or downwardly movably.

The upper casing 8 comprises a top wall 8a and a hollow cylindrical peripheral wall 8b. The peripheral wall 8b has an internally threaded portion, which is screwed on the externally threaded portion of peripheral wall 7b of the lower casing 7, whereby the upper casing 8 and the lower casing 7 are joined to define a space inside thereof. The top wall 8a of the upper casing 8 is provided with an internally threaded portion 14 formed in the center thereof and having an upward opening for connecting a compressed air admitting pipe, and a compressed air admitting downward passage 15 extending from the lower end of the internally threaded portion 14. The top wall 8a of the upper casing 8 has a central portion slightly projecting downward beyond the other portion thereof and is provided in its lower surface with a spring bearing annular recessed portion 16 around this central portion. This recessed portion 16 is used in the normally closed fluid control device 21 to be described later.

The valve stem 9 is formed integrally with the piston 10 so as to be a portion projecting downward from the center of the piston 10. The piston 10 comprises a large-diameter portion 10a slidably fitted in the upper casing 8 and serving as the main body of the piston, a small-diameter portion (already described as the valve stem) 9 slidably inserted through the center bore 13 in the lower casing 7, and a connecting portion 10b interconnecting the two portions 10a, 9 and having a diameter intermediate between the diameters of the two portions 10a, 9. An O-ring 17 is provided between the large-diameter portion 10a of the piston 10 and the upper casing 8. An O-ring 18 is provided also inside the center through bore 13 of the lower casing 7 around the small-diameter portion, i.e., the valve stem, 9 of the piston 10.

A lower space S2 for the compression spring 11 to be disposed therein is formed between and defined by the lower surface of large-diameter portion 10a of the piston 10 and the upper surface of bottom wall 7a of the lower casing 7. The compression coil spring 11 is fitted around the connecting portion 10b of the piston 10 and has an upper end bearing against and retained by the lower surface of large-diameter portion 10a of the piston 10 and a lower end retained by the spring bearing annular recessed portion 12 of the lower casing 7. An air vent 19 communicating with the lower space S2 is formed in the upper casing 8 so as to be positioned a small distance above the upper end of the lower casing 7.

In the channel opening state illustrated, the upper surface of large-diameter portion 10a of the piston 10 is brought into contact with the lower surface of top wall 8a of the upper casing 8 by the biasing force of the compression coil spring 11. An upper space S1 serving as a compressed air admitting space is formed between and defined by the upper surface of large-diameter portion 10a of the piston 10 and the lower surface of top wall 8a of the upper casing. Compressed air for moving the piston downward is introduced into the upper space S1 through the pipe connecting internally threaded portion 14 of top wall 8a of the upper casing 8 and the downward passage 15 extending from the portion 14.

Figure 2:
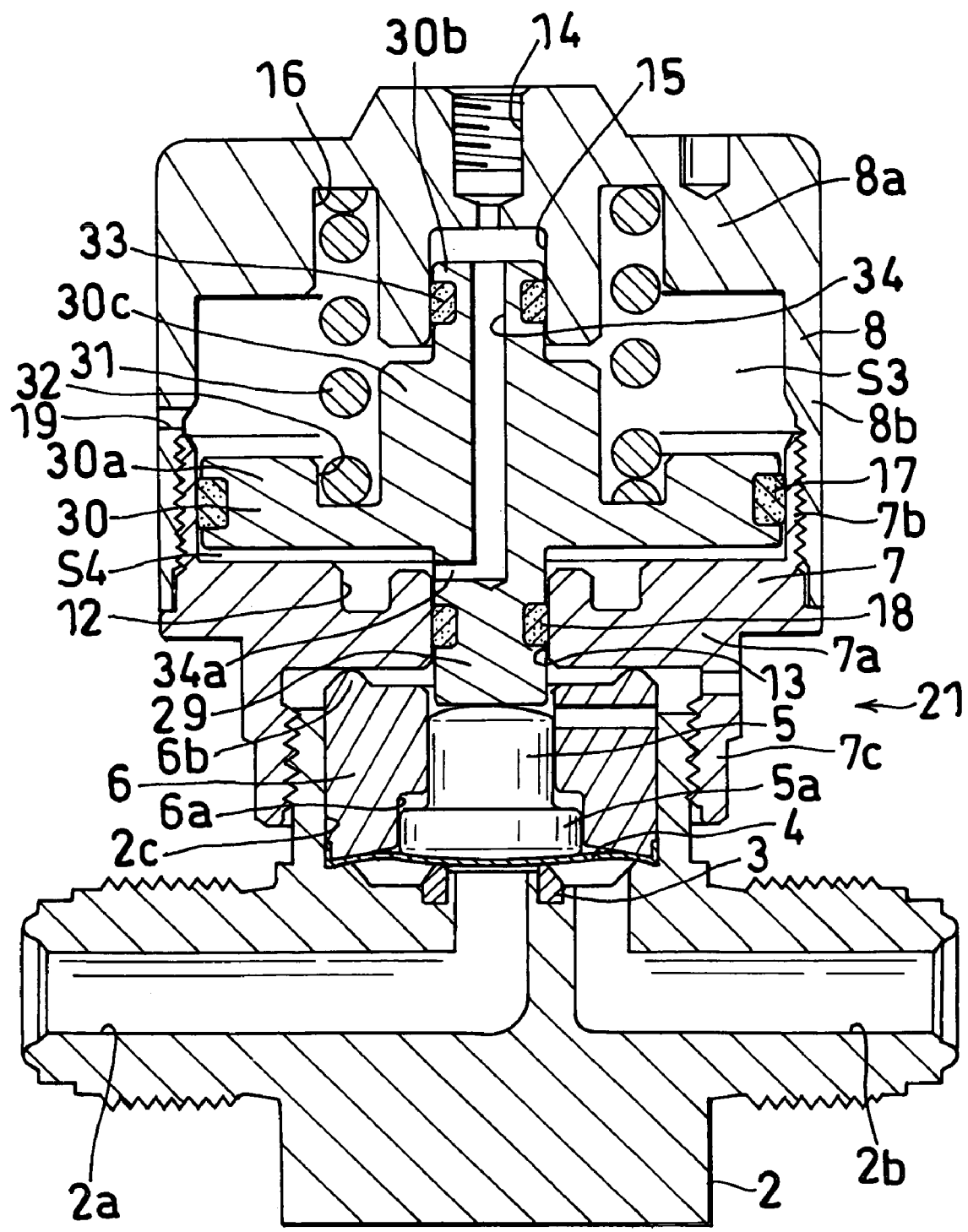
FIG. 2 is a sectional view showing a second embodiment of fluid control device (of the normally closed type) according to the invention.

FIG. 2 shows a second embodiment of fluid control device of the present invention. In the following description, the same components or portions as in the first embodiment will be designated by like reference numerals and will not be described repeatedly.

The fluid control device 21 of this embodiment is of the normally closed type and comprises a valve case 2 provided with a fluid inlet channel 2a and a fluid outlet channel 2b, an annular valve seat 3 formed around a peripheral edge defining an opening of the inlet channel 2a, a diaphragm (valve element) 4 movable into or out of pressing contact with the valve seat 3 for closing or opening the fluid channel 2a, a disk (vale element holder) 5 movable upward or downward for holding the diaphragm 4, a bonnet 6 fitted around the disk 5, a lower casing 7 provided on an upper portion of the valve case 2, an upper casing 8 joined to the lower casing 7, a valve stem 29 disposed within a space defined by the upper and lower casings 7, 8 and having a lower end in bearing contact with the valve element holder 5, a piston 30 secured to the valve stem 29, and a compression coil spring 31 for biasing the piston 10 downward.

The valve stem 29 is formed integrally with the piston 30 so as to be a portion projecting downward from the center of the piston 30. The piston 30 comprises a large-diameter portion 30a slidably fitted in the lower casing 7 and serving as the main body of the piston, a lower small-diameter portion (already described as the valve stem) 29 slidably inserted through a center through bore 13 in the lower casing 7, an upper small-diameter portion 30b slidably fitted in a compressed air admitting downward passage 15 in a top wall 8a of the upper casing 8, and a connecting portion 30c interconnecting the upper and small-diameter portion 30b and the large-diameter portions 30a and having a diameter intermediate between the diameters of the two portions 30a, 30b. A spring bearing annular recessed portion 32 is formed in the upper surface of the large-diameter portion 30a so as to be opposed to a spring bearing annular recessed portion 16 formed in the top wall 8a of the upper casing 8.

With this embodiment, an upper space S3 formed between and defined by the upper surface of the large-diameter portion 30a of the piston 30 and the upper surface of top wall 8a of the upper casing 8 serves as a space for the compressed coil spring 31 to be provided in. A lower space S4 formed between and defined by the lower surface of large-diameter portion 30a of the piston 30 and the upper surface of bottom wall 7a of the lower casing 7 serves as a compressed air admitting space. An air vent 19 communicating with the upper space S3 is formed in the upper casing 8 so as to be positioned a small distance above the upper end of the lower casing 7. This air vent 19 is formed at the same position as the one communicating with the lower space S2 in the first embodiment. This makes it possible to use the upper casing 8 in common for the normally open type and the normally closed type although the spaces S2 and S3 are different in function.

An O-ring 17 is provided between the large-diameter portion 30a of the piston 30 and the lower casing 7. An O-ring 18 is provided also between the lower small-diameter portion, i.e., the valve stem, 29 of the piston 30 and the peripheral surface of the lower casing 7 defining the center through bore 13. An O-ring 33 is further interposed between the upper small-diameter portion 30b of the piston 30 and the inner peripheral surface of the upper casing 8 defining the compressed air admitting downward passage 15, whereby the compressed air introduced into the downward passage 15 is prevented from flowing into the upper space S3.

The compression coil spring 31 is fitted around the connecting portion 30c of the piston 30 and has a lower end retained in the annular recessed portion 32 formed in the upper surface of large-diameter portion 30a of the piston 30 and an upper end retained in the annular recessed portion 16 in the upper casing 8.

The piston 30 is provided with a compressed air passageway 34 having an upper end in communication with the downward passage 15 in the top wall 8a of the upper casing 8 and a lower end in communication with the lower space S4. The passageway 34 extends through the upper small-diameter portion 30b, connecting portion 30c and large-diameter portion 30a of the piston 30 axially thereof, and this axial passageway portion has a lower end positioned within the lower small-diameter portion, i.e., the valve stem, 29, A radial passageway portion 34a extends from the passageway portion lower end through the lower small-diameter portion 29 radially thereof, whereby the passageway 34 is caused to communicate with the lower space S4. The compressed air for moving the piston 30 upward is introduced into a compressed air admitting pipe connecting internally threaded portion 14 of top wall 8a of the upper casing and the downward passage 15 extending from the portion 14, and admitted into the lower space S2 via the passageway 34 and the radial passageway portion 34a at the lower end thereof.

INDUSTRIAL APPLICABILITY

The present invention provides a fluid control device which is of the normally open type or normally closed type as determined in accordance with the direction of the biasing force of a spring incorporated therein and wherein a fluid channel is opened or closed by the supply or discharge of compressed air. The two fluid control devices of the normally closed type and the normally open type can be reduced in the combined number of components.

The invention claimed is:

1. A fluid control device comprising a valve case having a fluid channel, a valve element holder upwardly or downwardly movable for holding a valve element for opening or closing the fluid channel, a lower casing provided on an upper portion of the valve case, an upper casing joined to the lower casing, a valve stem disposed in a space defined by the upper and lower casings and having a lower end in bearing contact with the valve element holder and a piston secured to the valve stem, an upper space being formed between and defined by an upper surface of the piston and a lower surface of a top wall of the upper casing, a lower space being formed between and defined by a lower surface of the piston and an upper surface of a bottom wall of the lower casing, the fluid control device being characterized in that a compression coil spring is provided in one of the upper space and the lower space for biasing the piston, a compressed air admitting passageway being in communication with the other of the upper and lower space, such that, when the compression coil spring for biasing the piston is provided in the upper space with the compressed air admitting passageway in communication with the lower space, the fluid control device serves as a fluid control device of the normally closed type wherein the piston is biased downward axially, and when the compression coil spring for biasing the piston is provided in the lower space with the compressed air admitting passageway in communication with the upper space, the fluid control device serves as a fluid control device of the normally open type wherein the piston is biased upward axially, and the normally closed fluid control device and the normally open fluid control device are obtained by using the same valve case, same valve element, same valve element holder, same lower casing, and same upper casing, in configuration, respectively, and by using a different valve stem, different piston and different compression coil spring in configuration, respectively.

2. A fluid control device according to claim 1 wherein the valve stem and the piston are integral.

3. A fluid control device according to claim 1 or 2 wherein a spring bearing annular recessed portion is formed in each of the top wall lower surface of the upper casing and the bottom wall upper surface of the lower casing.

4. A fluid control device according to claim 3 wherein the top wall of the upper casing is provided with an internally threaded portion having an upward opening for connecting a compressed air admitting pipe and a compressed air admitting downward passage opened to the upper space and extending from a lower end of the internally threaded portion.

5. A fluid control device according to claim 4 which is of the normally open type and wherein the compression coil spring is retained by the lower surface of the piston and the annular recessed portion in the lower casing upper surface.

6. A fluid control device according to claim 4 which is of the normally closed type and wherein a spring bearing annular recessed portion is formed in the upper surface of the piston, and the compression coil spring is retained by the annular recessed portion of the piston and the annular recessed portion in the upper casing lower surface, the piston having an upper small-diameter portion fitted in the downward passage of the upper casing, the piston being provided with a compressed air passageway communicating at an upper end thereof with the downward passage in the top wall of the upper casing and at a lower end thereof with the lower space.

* * * * *